(12) United States Patent
Armstrong et al.

(10) Patent No.: US 6,711,700 B2
(45) Date of Patent: Mar. 23, 2004

(54) METHOD AND APPARATUS TO MONITOR THE RUN STATE OF A MULTI-PARTITIONED COMPUTER SYSTEM

(75) Inventors: Troy David Armstrong, Rochester, MN (US); William Joseph Armstrong, Mantorville, MN (US); Stephanie Maria Forsman, Rochester, MN (US); Naresh Nayar, Rochester, MN (US); Jeffrey Jay Scheel, Rochester, MN (US); Andy Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 09/840,345

(22) Filed: Apr. 23, 2001

(65) Prior Publication Data

US 2002/0156939 A1 Oct. 24, 2002

(51) Int. Cl.$^7$ ................................................ G06F 11/00
(52) U.S. Cl. .............................. 714/23; 714/10; 714/55; 712/13
(58) Field of Search ......................... 714/23, 55, 10; 712/13; 711/153, 173

(56) References Cited

U.S. PATENT DOCUMENTS

| | | | | |
|---|---|---|---|---|
| 4,696,002 A | * | 9/1987 | Schleupen et al. | 714/23 |
| 4,763,296 A | * | 8/1988 | Gercekci | 714/55 |
| 5,651,113 A | * | 7/1997 | Lin et al. | 714/56 |
| 5,717,942 A | * | 2/1998 | Haupt et al. | 712/13 |
| 6,044,447 A | | 3/2000 | Averill et al. | 711/207 |
| 6,076,157 A | | 6/2000 | Borkenhagen et al. | 712/228 |
| 6,105,051 A | | 8/2000 | Borkenhagen et al. | 709/103 |
| 6,199,179 B1 | | 3/2001 | Kauffman et al. | 714/26 |
| 6,467,007 B1 | * | 10/2002 | Armstrong et al. | 710/260 |

* cited by examiner

Primary Examiner—Scott Baderman
(74) Attorney, Agent, or Firm—Moser, Patterson & Sheridan, LLP

(57) ABSTRACT

An apparatus and method for monitoring the state of a computer system running multiple operating systems shared by a partition manager is provided. A dedicated service processor monitors the individual run state condition of a plurality of processors running a plurality of operating systems. The service processor executes a routine to poll a memory location in each processor in the system to determine if the processor has entered an error loop with interrupts disabled. If any one of the plurality of processors are in an error loop, the service processor executes a routine to send a non-maskable interrupt to the looped processor so that the partition manager may regain control of the processor.

24 Claims, 3 Drawing Sheets

METHOD AND APPARATUS TO MONITOR THE RUN STATE OF A MULTI-PARTITIONED COMPUTER SYSTEM

BACKGROUND OF THE INVENTION

1. Field of the Invention

The present invention relates to computer systems sharing partitioned operating systems running on multiple processors. More particularly, the invention relates to a method and apparatus to recover from a failure occurring in a single processor without affecting the operations of the other partitions.

2. Background of the Related Art

One advantage of a large computer system is its ability to accommodate multiple users accessing the system at virtually the same time. For many reasons, a user may prefer using one operating system to another operating system. Therefore, computer systems are able to accommodate its users by being compatible with diverse operating systems running at the same time. With many users accessing the computer system at the same time, the system may comprise multiple processors in order to speed up its operations.

In a computer system running two or more operating systems on a shared basis, each operating system resides in a logical partition in computer memory. A logical partition may also include one or more processors and a processor may be shared among logical partitions. A partition manager manages the operations in any shared processor by scheduling and dispatching an operating system to a processor. The dispatching of an operating system to a processor either occurs through an interrupt request generated by the partition manager or when an operating system yields the processor when it enters an idle state.

A processor, however, may ignore an interrupt request from the partition manager by disabling its external interrupts. This may occur when an errant processor or malfunctioning operating system enters a condition where it is no longer functioning properly. For example, a processor may be repeatably executing a step that has no solution. This error condition is generally known in the art as a looped condition.

When a processor is in a looped condition, the processor may not be able to accept commands, through interrupts, from the partition manager in the normal manner. This is because the processor may not have any of its interrupts enabled due to the error condition. Without an additional recovery mechanism in the computer system, the partition manager can not take control of the processor.

Furthermore, without an additional mechanism in the computer system, the condition of a processor is unknown. As an illustration, a system user may be waiting for a response from an operating system; however, unknown to the user, the processor is in a looped condition.

Conventionally, a looped condition may last indefinitely or until the system user intervenes and by some manner corrects the problem. Until the system user identifies that a problem likely exists, other operating systems on the system are excluded from the use of the looped processor. In order to regain control of the looped processor, the entire computer system must be shut-down and re-started. A re-start operation significantly affects other system users by generating system down time.

Therefore, there is a need for a method and apparatus to monitor the condition of a processor running multiple operating systems controlled by a partition manager. There is also a need for a method and apparatus to generate a corrective response to re-set a processor detected in a looped condition so that it may resume normal operation.

SUMMARY OF THE INVENTION

A method and apparatus is provided for monitoring the run state condition of a plurality of processors in a computer system. In one embodiment, a computer system comprises a timestamp clock to generate a timestamp value. Each of the plurality of processors first reads the timestamp clock and stores the value read in a memory location. After waiting a period greater than one timestamp clock period, each of the processors reads the timestamp clock again and stores that value in another memory location. The second timestamp value then is compared with the first time stamp value and if it is unchanged the processor is found to be in a looped condition. A service processor then generates an interrupt signal to re-set the looped processor.

In another embodiment, a method and apparatus is provided for monitoring the run state condition of a plurality of processors in a computer system. Illustratively, the plurality of processors comprise a plurality of multi-threaded processors running a plurality of operating systems. Each operating system is contained in a logical partition managed by a partition manager. The partition manager includes a data structure comprising a plurality of memory locations. The memory locations are used to store the respective timestamp values for each of the plurality of processors. A service processor contains a timestamp clock used to generate time stamp values and place the timestamp values in a timestamp memory location. The service processor is configured to periodically read the values contained in the timestamp memory locations for each of the processors and compare subsequent timestamp readings. A period between subsequent timestamp readings by the service processor is greater than a period between timestamp clock readings by each processor. If the subsequent timestamp is unchanged from a previous timestamp, the respective processor is found to be in a looped condition. The service processor then generates an interrupt signal to re-set the looped processor to return it to it normal operating state.

BRIEF DESCRIPTION OF THE DRAWINGS

So that the manner in which the above recited features and embodiments of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A method and apparatus for monitoring the state of a computer system running multiple operating systems controlled by a partition manager partition manager is provided.

A dedicated service processor monitors the individual run state condition of a plurality of processors running a plurality of operating systems. The service processor executes a routine to poll a memory location in each processor in the system to determine if the processor has entered an error loop with interrupts disabled. If any one of the plurality of processors are in an error loop, the service processor executes a routine to send a non-maskable interrupt (an interrupt than can not be disabled under any circumstance) to the looped processor. Once the service processor has sent the interrupt, the partition manager may regain control of the processor. By individually re-setting a looped processor, the remaining processors in the computer system continue processing.

In one embodiment, a dedicated service processor executes a routine to periodically poll a memory location in the partition manager, called the heartbeat area. The heartbeat area contains time stamped information detailing the run state condition of a plurality of central processors (CPU) in a computer system. If the time stamped information indicates that a CPU is in an otherwise unrecoverable error loop, the service processor sends a hardware interrupt signal to the CPU. The interrupt signal re-sets the CPU to take it out of the error loop so that it may resume normal operations.

Although embodiments described herein refer to a logically partitioned system, other embodiments are implemented in non-partitioned system. In general, embodiments of the present invention may be implemented in any system having at least one processor under the control of at least one operating system.

Figure 1:
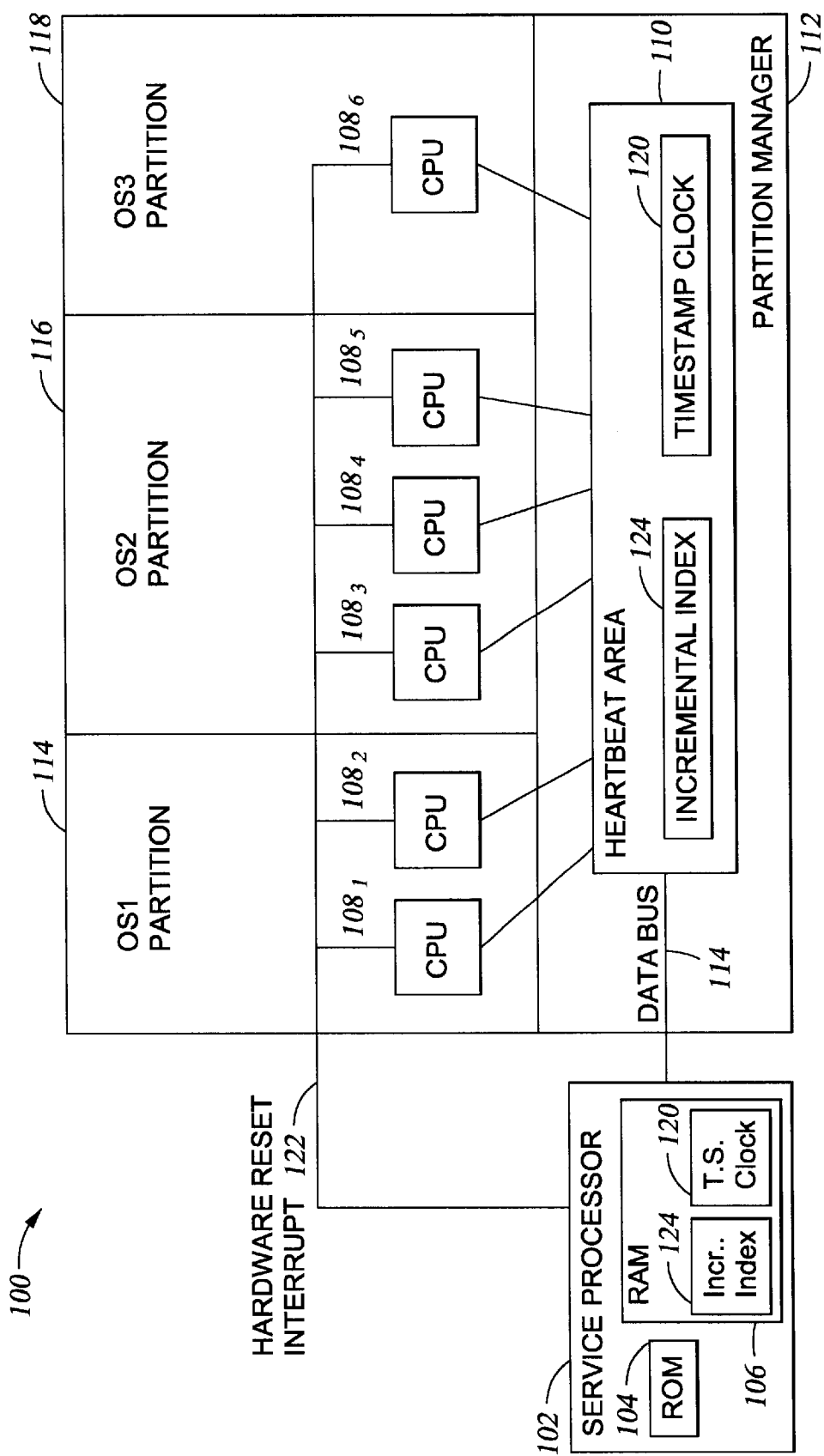
FIG. 1 shows a block diagram of the heartbeat monitoring system.

One embodiment of a heartbeat processing system 100 is shown in FIG. 1. FIG. 1 depicts a service processor 102 comprising a data bus 114 and an interrupt 122. The data bus terminal 114 of the service processor 102 is electrically coupled to the heartbeat area 110 through a data bus 114. The data bus 114 may be a serial or parallel bus configuration. The output terminal 122 of the service processor 102 is electrically coupled to an input terminal of a plurality of central processors (CPUs) $108_1$, $108_2$, $108_3$, $108_4$, $108_5$, $108_6$, (collectively referred to as CPUs 108). Although six CPUs 108 are shown, any number may be provided. In one embodiment, the service processor 102 may comprise read only memory (ROM) 104, and random access memory (RAM) 106 comprising an incremental counter 114 and a timestamp clock 120. A routine may be stored in ROM 104 that when executed will periodically read timestamp information from the timestamp clock 120 to determine if a CPU 108 is in a looped condition.

The system 100 is logically partitioned according to a number of operating systems. Illustratively, three partitions, each having an operating system, are shown in FIG. 1. Each operating system 114, 116, 118, controls a number of processors 108 and access devices (none shown). In the illustrated embodiment, a first operating system 114 controls two CPUs $108_{1-2}$, a second operating system 116 controls three CPUs $108_{3-5}$, and third operating system 114 controls one CPU $108_6$.

Each of the operating systems 114, 116, 118 are under the control of a partition manager 112. Illustratively, the partition manager 112 is a logical partition manager routine known in the art that manages the allocation of computer system resources to a plurality of CPUs. In the embodiment shown in FIG. 1, the partition manager 112 allocates operating system 114 to CPU $108_{1-2}$, operating system 116 to CPU $108_{3-5}$, and operating system 118 to CPU $108_6$. The allocation of operating systems to CPUs by the partition manager 112 is based on user demands.

In another embodiment, a CPU 180 may be shared between logical partitions under the control of the partition manager 112. Illustratively, CPU $108_2$ may be shared between operating system 114 and operating system 116. Also, CPU $108_4$ may be shared between operating system 116 and operating system 118.

In still another embodiment, each CPU 180 may be a multi-threaded processor capable of executing a multi-threaded operating system. In a multi-threaded system, an operating system has the ability to execute different parts of a program, called threads, simultaneously. An operating system may be constructed to run all threads concurrently without interfering with each other. Illustratively, each CPU 180 may share system resources such as special purpose registers with other threads on the processor.

In one embodiment, the partition manager 112 includes the heartbeat area 110. The heartbeat area 110 may be any memory space configured to store the time stamped information. As an illustration, the timestamp clock 120 provides a value reflecting the forward progress of the system clock in the service processor 102. The timestamp value may be read by the CPUs 108 and stored in a memory location in the heartbeat area 110. Although shown as a component of the service processor 102, in other embodiments the timestamp clock 120 is separate from the service processor 102. Similarly, the heartbeat area 110 may be separate from the partition manager 112.

Figure 2:
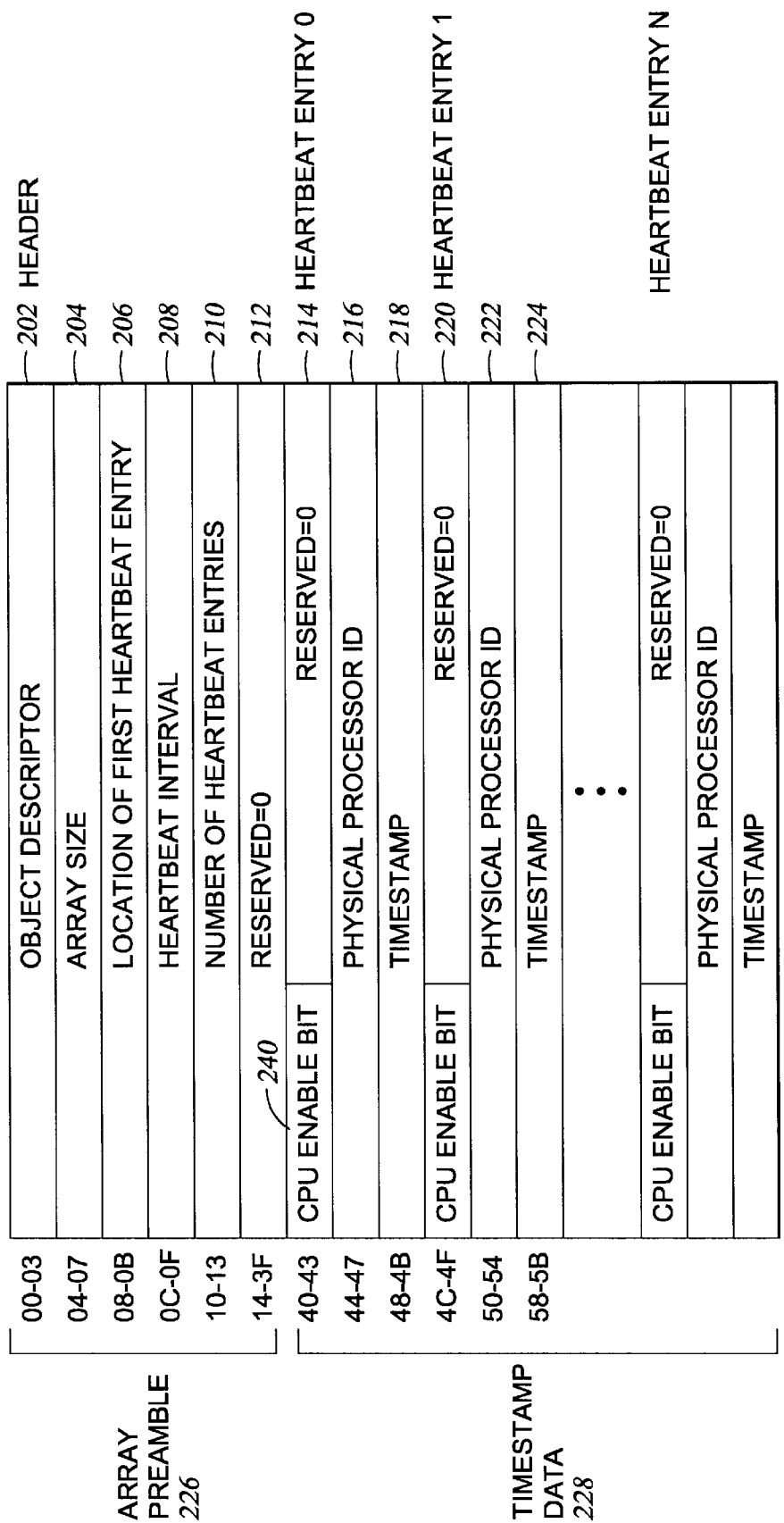
FIG. 2 shows a heartbeat area data structure.

FIG. 2 illustrates a data structure 200 of the time stamped information that may be contained in the heartbeat area 110. Illustratively, the data structure is an array, but other data structures are contemplated. The structure 200 comprises a plurality of entries including a preamble 226 and timestamp data 228. In general, the preamble 226 includes a plurality of header entries that define the array and timestamp data 228 that contains a plurality of heartbeat entries. Each heartbeat entry represents the run state condition of an individual CPU 108. For purposes of illustration, a memory location (shown on the left-hand side of the data structure 200 and represented as a hexadecimal number) has been provided for each entry. The memory locations shown in FIG. 2 are merely illustrative as the data structure 200 may occupy any block of contiguous memory. As an illustration, an object descriptor entry 202 is located at memory location 00-03. In this example, the object descriptor is an array object.

A size entry 204 at memory location 04-07 contains the size of the array structure 200 in bytes. In one embodiment, the size of the array may be declared by the partition manager 112 at the time its routine is initialized. The size of the array may vary due to the quantity of CPU's polled by the partition manager 112 at any given time. For example, the partition manager may be directed by a system user to poll less than all of the CPU's 118 included in the computer system.

A location entry 206 at memory location 08-0B defines the memory location of the first heartbeat entry in the array structure 200. In this example, the first heartbeat entry, Heartbeat Entry 0 214, begins at memory location 40. The location entry 206 serves as a program pointer to direct a timestamp read operation directly to the timestamp data 228.

Figure 3:
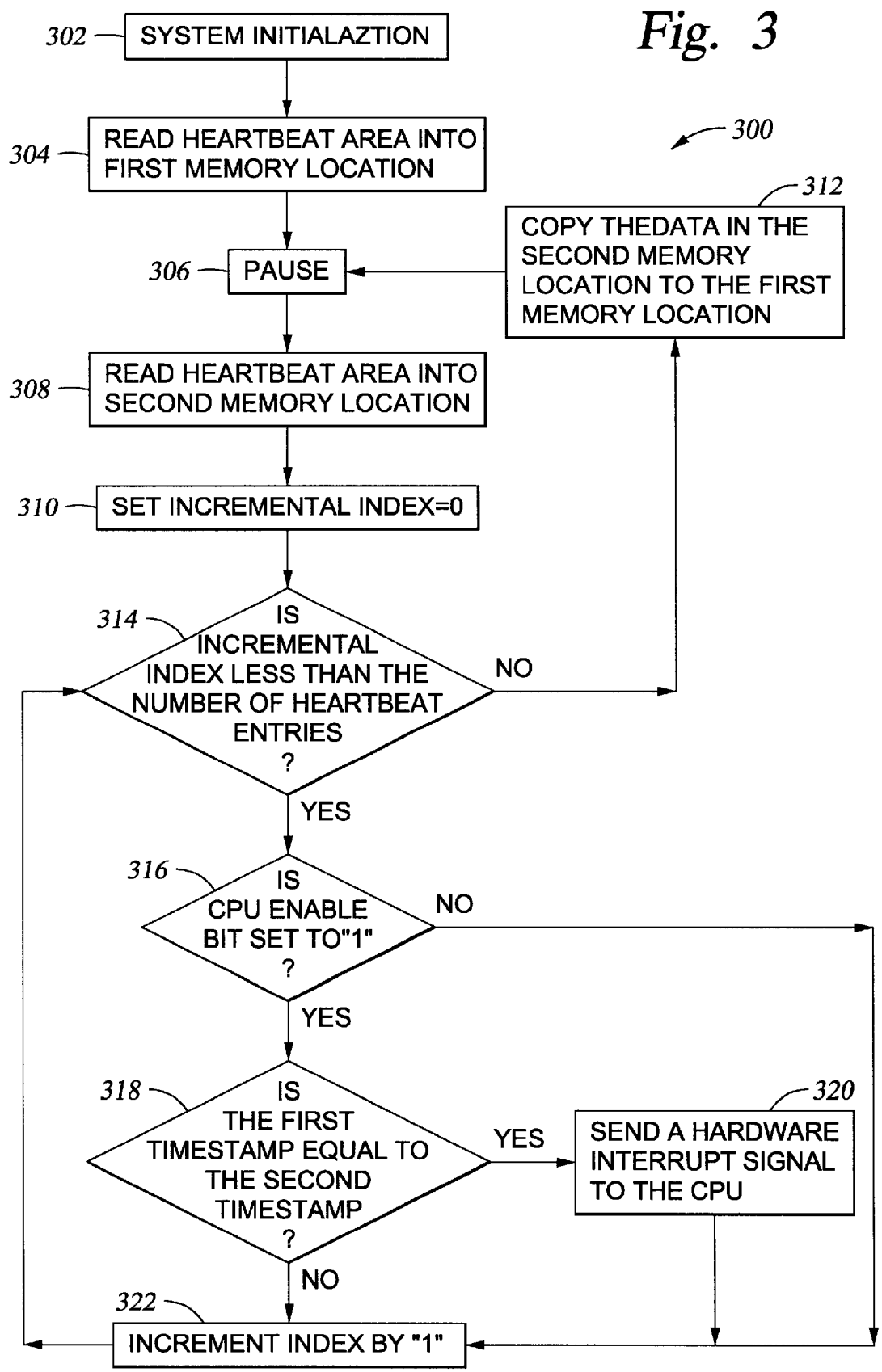
FIG. 3 show a flow diagram of the method.

The heartbeat interval 208, in milliseconds, is stored in memory location 0C-0F. The heartbeat interval 208 instructs the partition manager 112 how often to poll the run-state condition of the CPU's 118. The heartbeat interval 208 may be any arbitrary period less than the wait state period 306 shown in FIG. 3.

Referring again to FIG. 2, an index of heartbeat entries 210 is stored in memory location 10-13. The index of heartbeat entries 210 defines the number of heartbeat entries in the array structure 200. This index represents the quantity of CPU's currently being polled by the partition manager 112. In the illustrated embodiment, memory location 14-3F 21 is reserved and contains no data. As an illustration, this memory location may contain data that identifies a particular system user.

The address location of the first heartbeat entry, Heartbeat Entry 0 214, is stored in memory location 40-43 in the array structure 200. As an illustration, a heartbeat entry includes an enable bit 240, a physical processor identification (ID) 216 and a timestamp 218. The enable bit 240 if switched to a logical "1" indicates to the partition manager 112 that the particular CPU 108 should be polled. The physical processor ID 216 denotes the CPU 108 that is associated with a particular heartbeat entry. The physical processor ID 2416 may be a value embedded in the CPU 108 at the time of manufacture or may be a value assigned by the partition manager 112. The timestamp 218 is a numerical value sent to the partition manager 112 by a CPU 108 in response to a polling operation by the partition manager 112.

The timestamp 218 represents a value read from a timestamp clock and can be any value that is incremented by real time. As an illustration, a timestamp clock 120 may be stored in a memory location in the partition manager 112. The timestamp clock 120 is set to zero upon initialization 302 and then incremented one unit for each computer system clock cycle. While each CPU 108 is processing data, processing interrupts or in an idle state, each CPU 108 periodically reads the timestamp clock 120. Each CPU 108 stores the value read from the timestamp clock 120 in the array structure 200 as a timestamp 244.

One embodiment illustrating the operation of the heartbeat processing system 100 is shown as a method 300. The method 300 is entered at step 302 where the heartbeat processing system 100 is initialized. Illustratively, this step may be invoked whenever the heartbeat processing system 100 is started up from a power down condition or from a user invoked re-start command while the system is already powered up.

At step 302, the partition manager 112 initializes each heartbeat area 110 by clearing any values stored in the heartbeat array structure 200. The partition manager 112 then defines the size of the array structure 200 and stores that value in the heartbeat area 110 in memory location 04-07 204. It then stores the heartbeat interval in memory location 0C-0F 208, sets the enable bit 240 for each CPU 108 to be polled, and finally sets the timestamp 248 to zero.

At step 304 the service processor 102 reads the entire heartbeat area 110 in array structure 200 and stores the information in a first memory location in RAM 106. The stored information will serve as a first reference to a later reading of the heartbeat area 110.

At step 306, the method 300 goes into a wait state for the period stored in the heartbeat interval 208. While in this wait state, each CPU 108 is processing data and periodically storing an updated timestamp data 228 in the array structure 200 located in the heartbeat area 110. The period for each CPU 108 to store an updated timestamp is less than the wait state period in this step 304. This ensures the CPU 108 will update its associated timestamp data 228 unless the CPU 108 is in a looped condition.

At step 308, the service processor 102 reads the entire heartbeat area 110 and stores the information in a second memory location in RAM 106. The stored information will be used as a reference to the first stored reference information performed in step 304.

At step 310, an incremental index 124 is set to zero. The incremental index 124 is used as a counter to track and process each heartbeat entry in the array structure 200. For example, when the index is at "0" the index corresponds to heartbeat entry 0 214. If the index is at "1" the index corresponds to heartbeat entry 1 220, and so on.

At step 314, the method 300 queries if the incremental index 124 is less than the number of heartbeat entries specified 210 in the array structure 200. If answered negatively, then all of the heartbeat entries have been processed and the method 300 proceeds to step 312. If answered affirmatively, the method 300 proceeds to step 316 to process the remaining heartbeat entries.

At step 314, the routine queries if the CPU 108, corresponding to the incremental index 124, has its enable bit 240 set to a logical "1". If so, the CPU 108 has been flagged to be serviced by the service processor 102 and the method 300 proceeds to step 318 to process the heartbeat entry. If not, the method 300 proceeds to step 322.

At step 318, the method 300 queries if the heartbeat timestamp 244 read in step 304 is identical to the heartbeat timestamp 244 read in step 308. If the timestamps 244 are equal, this indicates that the CPU 108 is in a looped condition requiring hardware reset 122 by the service processor 102. The method 300 then proceeds to step 320. If the timestamps are not equal, the CPU 108 is functioning properly and the method 300 proceeds to step 322.

At step 320, the service processor 102 sends a hardware reset 122 signal to the CPU 108 found in a looped condition. Once the CPU 108 is re-set, it can then resume normal operation. The method 300 then proceeds to step 322.

At step 322, the incremental index 124 is incremented by one unit. The routine then proceeds back to step 314 until all heartbeat entries in the array structure 200 have been processed. If so, the method 300 proceeds to step 312.

At step 312, the heartbeat data read in step 304 is stored into the first memory location in RAM 106. The data stored in the first memory location will be used as a reference to data later read in subsequent iterations of step 308 and compared in step 318. As such, a first-in-first-out (FIFO) method is explained with respect to the heartbeat data in RAM 106.

While the foregoing is directed to the preferred embodiment of the present invention, other and further embodiments of the invention may be devised without departing from the basic scope thereof, and the scope thereof is determined by the claims that follow.

What is claimed is:

1. A computer system including a plurality of processors, the system comprising:
   a timestamp clock;
   a memory containing a data structure comprising a respective memory location for each of the plurality of processors; wherein the each of the plurality of processors, during normal operation, is configured to periodically write a timestamp value read from the timestamp clock to its respective timestamp memory location;
   a service processor electrically coupled to the plurality of processors, wherein the service processor generates an electrical signal to reset a processor of the plurality of processors if a previously read timestamp value read by the service processor from the respective timestamp memory location is unchanged after a subsequent reading.

2. The computer system of claim 1, further comprising an incremental counter to provide an index of the plurality of processors.

3. The computer system of claim 1, wherein the timestamp clock runs in real time.

4. The computer system of claim 1, wherein the memory is integral to the service processor.

5. The computer system of claim 4, wherein the memory contains a partition manager and the plurality of processors are logically partitioned.

6. The computer system of claim 1, wherein the service processor is configured to read the respective timestamp memory location for each processor at a first rate less frequent then a second rate at which each processor, during normal operation, writes the timestamp value to its respective memory location.

7. The computer system of claim 1, wherein the plurality of processors are multi-threaded processors.

8. A method for resetting one of a plurality of processors when a service processor detects a looped condition in any one of the plurality of processors, comprising:
    reading from a timestamp memory location at a first time; wherein the timestamp memory location is configured to store a timestamp read by one of the plurality of processors from a timestamp clock;
    waiting a predetermined period;
    reading from the timestamp memory location at a second time;
    comparing a first timestamp read at the first time to a second timestamp read at the second time; and
    generating an electrical signal to re-set the one of the plurality of processors if the first timestamp is unchanged from the second timestamp.

9. The method of claim 8, wherein the predetermined period allows the service processor to read a timestamp memory location at a first time for each processor at a first rate less frequent then a second rate at which each processor, during normal operation, reads a second timestamp.

10. The method of claim 8, further comprising generating an index of the plurality of processors by incrementally counting the plurality of processors.

11. The method of claim 10, wherein claim 8 is performed for each of the plurality of processors specified by the index.

12. A computer system including a plurality of processors, operating systems and logical partitions; the system comprising:
    a timestamp clock;
    a partition manager to allocate system resources among the plurality of logical partitions;
    a memory integral to the partition manager containing a data structure comprising a respective memory location for each of the plurality of processors; wherein the each of the plurality of processors, during normal operation, is configured to periodically write a timestamp value read from the timestamp clock to its respective timestamp memory location;
    a service processor electrically coupled to the plurality of processors, wherein the service processor generates an electrical signal to reset a processor of the plurality of processors if a previously read timestamp value read by the service processor from the respective timestamp memory location is unchanged after a subsequent reading.

13. The computer system of claim 12, wherein the partition manager further comprises an incremental counter to provide an index of the plurality of processors.

14. The computer system of claim 12, wherein the service processor is configured to read the respective timestamp memory location for each processor at a first rate less frequent then a second rate at which each processor, during normal operation, writes the timestamp value to its respective memory location.

15. The computer system of claim 12, wherein the timestamp clock runs in real time.

16. The computer system of claim 12, wherein the service processor comprises integral memory.

17. The computer system of claim 16, wherein the previously read timestamp value is stored in memory in the service processor.

18. The computer system of claim 12, wherein the plurality of processors are multi-threaded processors.

19. In a computer system including a plurality of processors contained in a plurality of logical partitions, wherein at least one operating system is running in each logical partition, a method for re-setting one of a plurality of processors, comprising:
    reading from a timestamp memory location at a first time; wherein the timestamp memory location is configured to store a timestamp read by one of the plurality of processors from a timestamp clock;
    waiting a predetermined period;
    reading from the timestamp memory location at a second time;
    comparing a first timestamp read at the first time to a second timestamp read at the second time; and
    generating an electrical signal to re-set one of the plurality of processors if the first timestamp is unchanged from the second timestamp.

20. The method of claim 19, wherein the predetermined period allows the service processor to read a timestamp memory location at a first time for each processor at a first rate less frequent then a second rate at which each processor, during normal operation, reads a second timestamp.

21. The method of claim 20, further comprising generating an index of the plurality of processors by incrementally counting the plurality of processors.

22. The method of claim 21, wherein claim 19 is performed for each of the plurality of processors specified by the index.

23. The method of claim 19, further including assigning a first memory location for each of the plurality of processors, wherein the first read timestamp by each of the plurality of processors, is stored in the first assigned memory location.

24. The method of claim 23, further including assigning a second memory location for each of the plurality of processors, wherein the second read timestamp by each of the plurality of processors, is stored in the second assigned memory location.

* * * * *